US012737388B2

(12) United States Patent
Isomura et al.

(10) Patent No.: US 12,737,388 B2
(45) Date of Patent: Sep. 15, 2026

(54) REVERSE GEOCODING APPARATUS, REVERSE GEOCODING METHOD, AND PROGRAM

(71) Applicant: Nippon Telegraph and Telephone Corporation, Tokyo (JP)

(72) Inventors: Atsushi Isomura, Musashino (JP); Isoo Ueno, Musashino (JP); Naoko Shigematsu, Musashino (JP); Nobuhiro Oki, Musashino (JP); Ichibe Naito, Musashino (JP)

(73) Assignee: NTT, Inc., Tokyo (JP)

( * ) Notice: Subject to any disclaimer, the term of this patent is extended or adjusted under 35 U.S.C. 154(b) by 378 days.

(21) Appl. No.: 18/552,522

(22) PCT Filed: Mar. 30, 2021

(86) PCT No.: PCT/JP2021/013544

§ 371 (c)(1),
(2) Date: Sep. 26, 2023

(87) PCT Pub. No.: WO2022/208660

PCT Pub. Date: Oct. 6, 2022

(65) Prior Publication Data

US 2024/0184809 A1 Jun. 6, 2024

(51) Int. Cl.
*G06F 16/29* (2019.01)

(52) U.S. Cl.
CPC .................................... *G06F 16/29* (2019.01)

(58) Field of Classification Search
None
See application file for complete search history.

(56) References Cited

U.S. PATENT DOCUMENTS

2012/0322561 A1* 12/2012 Kohlhoff ............... A63F 13/216 463/42
2020/0026721 A1* 1/2020 Simms .................... G06F 16/29

FOREIGN PATENT DOCUMENTS

JP 5000965 B2 * 8/2012
JP 5399813 B2 * 1/2014

OTHER PUBLICATIONS

Google.com [online], "Google Maps API Version 3 Japanese document (unofficial)," Google LLC, available on or before Jan. 2010, retrieved on Feb. 24, 2021, retrieved from URL<https://sites.google.com/site/gmapsapi3/Home/services>, 41 pages (with machine translation).
[No Author Listed] [online], "Simple reverse geocoding service," National Agriculture and Food Research Organization, retrieved on Feb. 24, 2021, retrieved from URL<https://aginfo.cgk.afirc.go.jp/rgeocode/index.html.jaE2021/02/24>, 23 pages (with machine translation).

* cited by examiner

*Primary Examiner* — Idowu O Osifade
(74) *Attorney, Agent, or Firm* — Fish & Richardson P.C.

(57) ABSTRACT

A reverse geocoding device includes a database that stores polygons and meshes in association with each other, and a search unit. The search unit inputs position information and search accuracy, and converts the position information into a mesh having a size depending on the search accuracy. The search unit searches the database for a polygon associated with the obtained mesh, identifies a polygon corresponding to the position information from among polygons obtained by search, and returns information given to the polygon.

4 Claims, 10 Drawing Sheets

Fig. 1

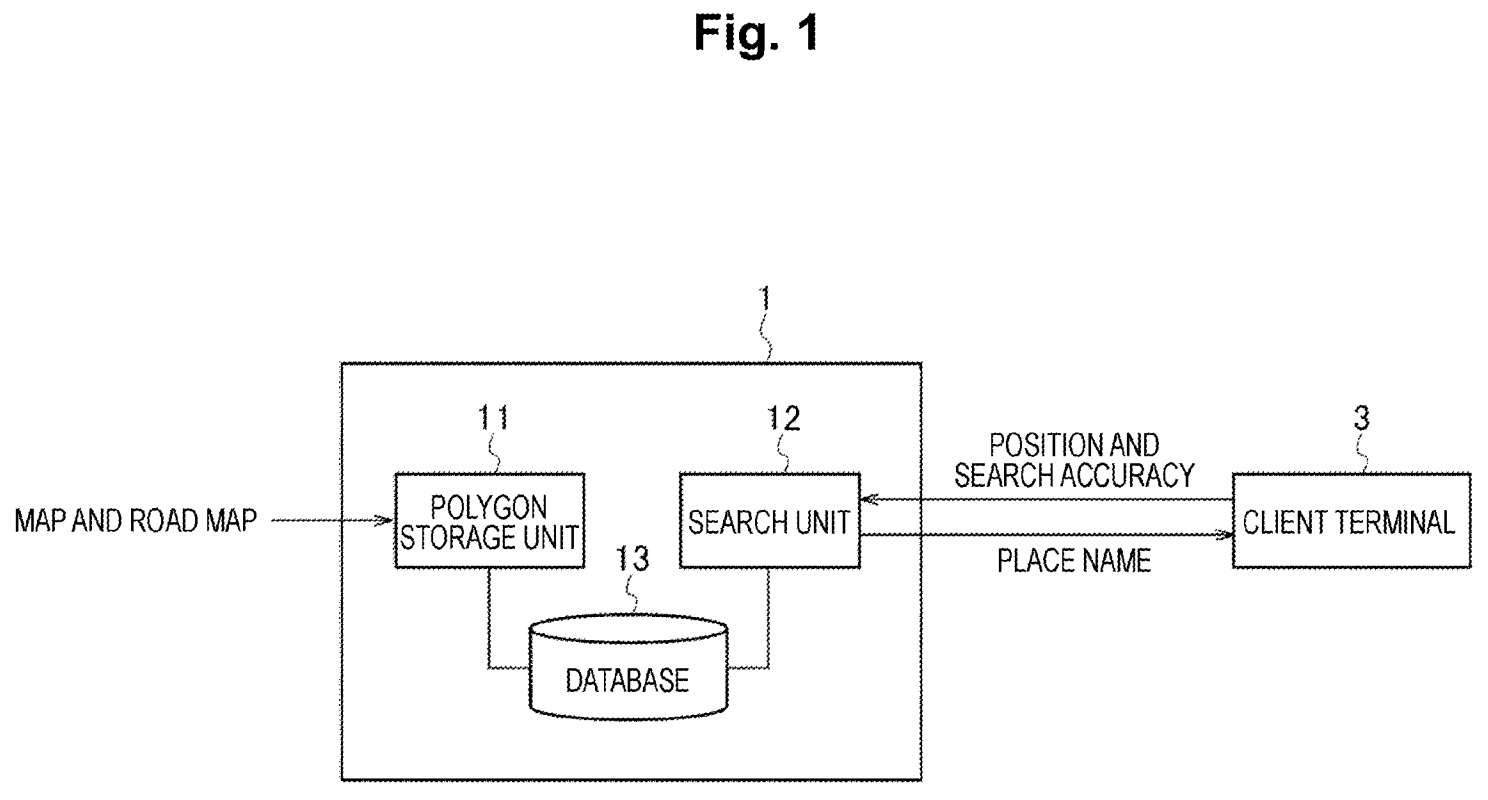

1
11 POLYGON STORAGE UNIT
12 SEARCH UNIT
13 DATABASE
3 CLIENT TERMINAL
POSITION AND SEARCH ACCURACY
PLACE NAME
MAP AND ROAD MAP

ID: A ROAD B LANE
PLACE NAME: C CITY
SHAPE INFORMATION:
[(x1,y1),(x2,y2),(x3,y3),(x4,y4)]

Fig. 4

| MESH | POLYGON ID |
|---|---|
| 011001 | A ROAD |
| 01100100 | A ROAD B LANE |
| 01100110 | A ROAD B LANE |
| 01100101 | A ROAD C LANE |
| 01100111 | A ROAD C LANE |
| 011011 | D ROAD |
| 011011 | E ROAD |
| : | : |

REVERSE GEOCODING APPARATUS, REVERSE GEOCODING METHOD, AND PROGRAM

CROSS-REFERENCE TO RELATED APPLICATIONS

This application is a National Stage application under 35 U.S.C. § 371 of International Application No. PCT/JP2021/013544, having an International Filing Date of Mar. 30, 2021, the disclosure of which is considered part of the disclosure of this application, and is incorporated by reference in its entirety into this application.

TECHNICAL FIELD

The present invention relates to a reverse geocoding device, a reverse geocoding method, and a program.

BACKGROUND ART

Reverse geocoding is a technique of searching for a semantic place (for example, a municipal name, a road name, a building name, and the like) to which a position indicated by latitude and longitude belongs, by inputting the latitude and longitude. In recent years, as in Non Patent Literature 1 and Non Patent Literature 2, an application programming interface (API) for reverse geocoding has been provided.

CITATION LIST

Non Patent Literature

Non Patent Literature 1: "Simple Reverse Geocoding Service", [online], National Agriculture and Food Research Organization, [Searched on Feb. 24, 2021], Internet (URL: https://aginfo.cgk.affrc.go.jp/rgeocode/index.html.ja)

Non Patent Literature 2: "Google Maps API Version 3 Japanese document (unofficial document)", [online], Google LLC, [Searched on Feb. 24, 2021], Internet (URL: https://sites.google.com/site/gmapsapi3/Home/services)

SUMMARY OF INVENTION

Technical Problem

In conventional reverse geocoding, polygons divided by administrative divisions are stored in a database, and when latitude and longitude are input, search is performed for a polygon including a position indicated by the latitude and longitude, and a place name indicated by the polygon is returned. To search for a polygon including a designated position, it is necessary to perform geometric calculation and distance calculation for all polygons in the database, and thus, there has been a problem that a processing load is large and processing is slowed down to handle a large number of requests in real time.

The present invention has been made in view of the above, and an object thereof is to speed up reverse geocoding processing.

Solution to Problem

A reverse geocoding device of an aspect of the present invention includes: a database that stores polygons and meshes in association with each other; an input unit that inputs position information and search accuracy; a search unit that converts the position information into a mesh having a size depending on the search accuracy, searches the database for a polygon associated with the mesh, and identifies a polygon corresponding to the position information from among polygons obtained by search; and a return unit that returns information given to the polygon.

A reverse geocoding method of an aspect of the present invention is a reverse geocoding method executed by a reverse geocoding device including a database that stores polygons and meshes in association with each other, the reverse geocoding method including: inputting position information and search accuracy; converting the position information into a mesh having a size depending on the search accuracy; searching the database for a polygon associated with the mesh; identifying a polygon corresponding to the position information from among polygons obtained by the searching; and returning information given to the polygon.

Advantageous Effects of Invention

According to the present invention, it is possible to speed up reverse geocoding processing.

BRIEF DESCRIPTION OF DRAWINGS

FIG. 1 is a functional block diagram illustrating an example of a configuration of a reverse geocoding device of a present embodiment.

FIG. 4 is a diagram illustrating an example of correspondence information between a polygon and a mesh.

DESCRIPTION OF EMBODIMENTS

Figure 2:
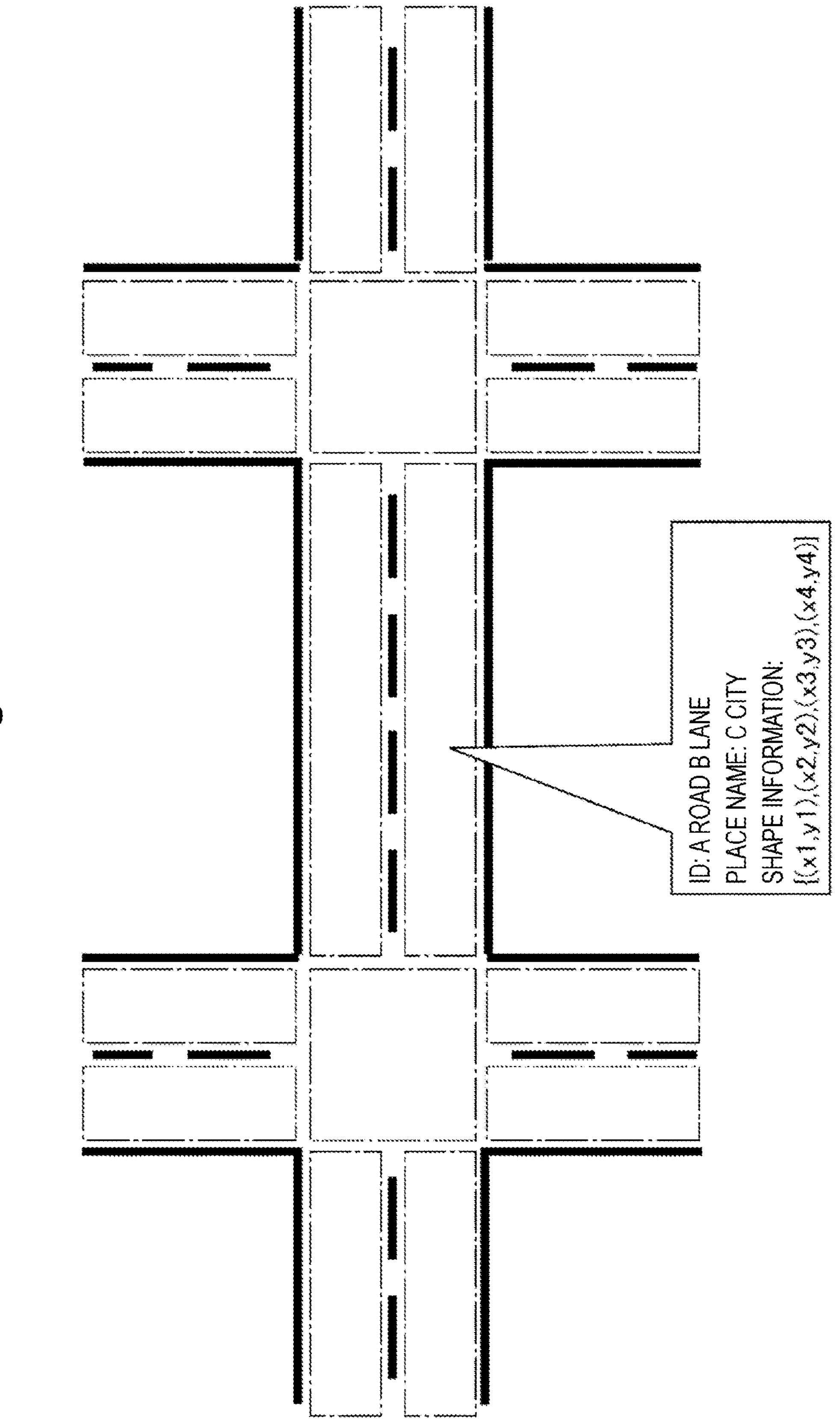
FIG. 2 is a diagram illustrating an example of a polygon.

Hereinafter, an embodiment of the present invention will be described with reference to the drawings.

FIG. 1 is a functional block diagram illustrating an example of a configuration of a reverse geocoding device 1 of a present embodiment. The reverse geocoding device 1 illustrated in FIG. 1 associates a mesh obtained by dividing the earth by a predetermined rule with a polygon obtained by semantically dividing a place, obtains a mesh depending on search accuracy when a position and search accuracy are input from a client terminal 3, searches for a polygon associated with the mesh, and returns information given to the polygon, for example, an address or a name of the place (facility name, road name, and the like). The reverse geocoding device 1 includes a polygon storage unit 11, a search unit 12, and a database 13.

The polygon storage unit 11 inputs polygon information and stores the polygon information in the database 13, identifies a mesh to which a polygon belongs, and stores the polygon and the mesh in the database 13 in association with each other.

The polygon is a polygonal section obtained by dividing a map by any line segment. FIG. 2 illustrates an example of the polygon. In the example of FIG. 2, a polygon obtained by dividing one lane between intersections is surrounded by a one dot chain line. The inside of the intersection is also one polygon. For each polygon, polygon information is held. Examples of the polygon information include a polygon ID, a place name, and shape information on a polygon. The polygon ID is an identifier for identifying a polygon. A polygon name such as a road name or a building name may be used as the polygon ID. The place name is information returned as a search result, and is semantic information on a section to which a polygon belongs. Information other than the place name may be included in the polygon information and returned as the search result. The shape information is information indicating a position and a shape of a polygon on the map. For example, the shape information is the latitude and longitude of each vertex of the polygon. The shape of the polygon can be known by sequentially connecting the vertices together. The shape information is used for identifying a mesh in which a polygon exists and identifying a polygon including a position input by a user.

Figure 3:
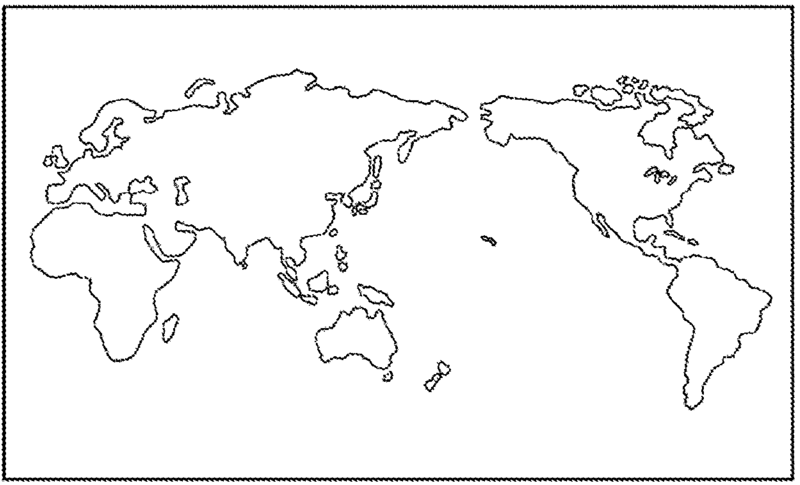
FIG. 3 is a diagram illustrating an example of a mesh.
Figure 3:
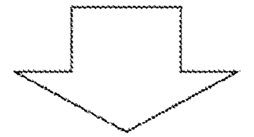
Figure 3:
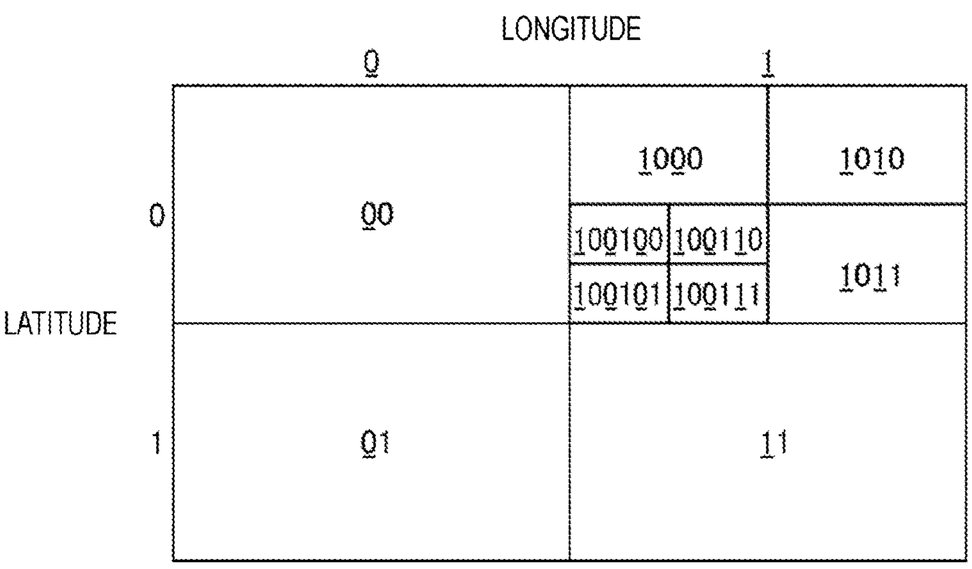

The mesh is a rectangle generated by regularly dividing a map on the basis of latitude and longitude. FIG. 3 illustrates an example of the mesh. In the example of FIG. 3, the mesh is generated by repeating the division of the map into four. When the mesh is divided into four, 2-bit information is added to a bit array indicating the mesh. For example, a mesh obtained by dividing the entire map into four is represented by a 2-bit bit array. To a mesh obtained by further division into four, 2-bit information is added, and the mesh is represented by a 4-bit bit array. The mesh in a narrower area is represented by a longer bit array. The meshes have a hierarchical structure. The meshes with the same high-order bits exist in a wide mesh represented by the same high-order bits. For the mesh, Geohash obtained by converting latitude and longitude into a character string can be used. In Geohash, a mesh having any size can be represented by a length of a character string.

Note that, when a map or a road map is input, the polygon storage unit 11 may analyze the map or the road map to generate a polygon indicating an administrative division or a polygon indicating a road or a lane. The polygon storage unit 11 gives information such as a place name or a road name to the generated polygon, stores the polygon in the database 13, and stores the polygon and the mesh in the database 13 in association with each other.

The search unit 12 inputs position information represented by latitude and longitude and the search accuracy, and obtains a mesh corresponding to the position information depending on the search accuracy. A length of the bit array into which the search unit 12 converts the position information, that is, a size of the mesh obtained by the search unit 12 changes depending on the search accuracy. Specifically, in a case where high search accuracy is designated, the search unit 12 converts the position information into a short bit array and obtains a wide mesh corresponding to the position information. In a case where low search accuracy is designated, the search unit 12 converts the position information into a long bit array and obtains a narrow mesh corresponding to the position information.

The search unit 12 searches the database 13 for a polygon associated with the obtained mesh, and identifies a polygon including the input position from among polygons of the search result. The search unit 12 returns the information given to the identified polygon. The information to be returned is, for example, an address or a name of a place included in the polygon information corresponding to the position.

The database 13 stores the polygon information and correspondence information in which polygons and meshes are associated with each other. FIG. 4 illustrates an example of correspondence information between a polygon and a mesh. In the example of FIG. 4, the database 13 stores a table in which polygon IDs are associated with bit arrays indicating meshes. The same polygon may be associated with a plurality of meshes, or a plurality of polygons may be associated with one mesh. For example, in the example of FIG. 4, one polygon "A road B lane" is associated with two meshes "0110011" and "0110010". Two polygons "D road" and "E road" are associated with one mesh "011011". In addition, meshes having different bit array lengths may be stored, or polygons having different granularities may be stored. For example, in the example of FIG. 4, a mesh "011001" and meshes "01100100", "01100101", "01100110", and "01100111" obtained by dividing the mesh "011001" into four are stored. The polygon "A road" is associated with the mesh "011001". Polygons obtained by dividing the A road by lanes are associated with the meshes "01100100", "01100101", "01100110", and "01100111". Note that the way of holding data is an example, and the present invention is not limited thereto. Any data may be used as long as a correspondence relationship between a mesh and a polygon can be known. For example, the associated mesh may be held in the polygon information.

Figure 5:
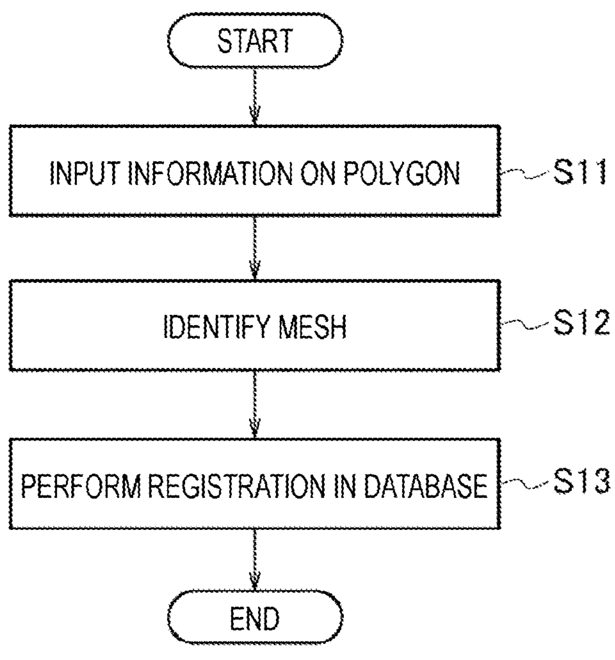
FIG. 5 is a flowchart illustrating an example of a flow of processing of storing correspondence information between a polygon and a mesh in a database.

Next, a flow of processing of associating a polygon with a mesh will be described with reference to a flowchart of FIG. 5.

In step S11, the polygon storage unit 11 inputs the polygon information, and stores the polygon information in the database 13. The polygon information is, for example, a polygon ID, a place name, and shape information. The polygon storage unit 11 may input a map or a road map and generate polygon information from the map or the road map.

In step S12, the polygon storage unit 11 identifies a mesh including a polygon. Specifically, the polygon storage unit 11 converts each vertex of the polygon into a bit array of a mesh at any level. The obtained bit array indicates a mesh including the polygon. The size of the mesh can be arbitrarily set.

Figure 6:
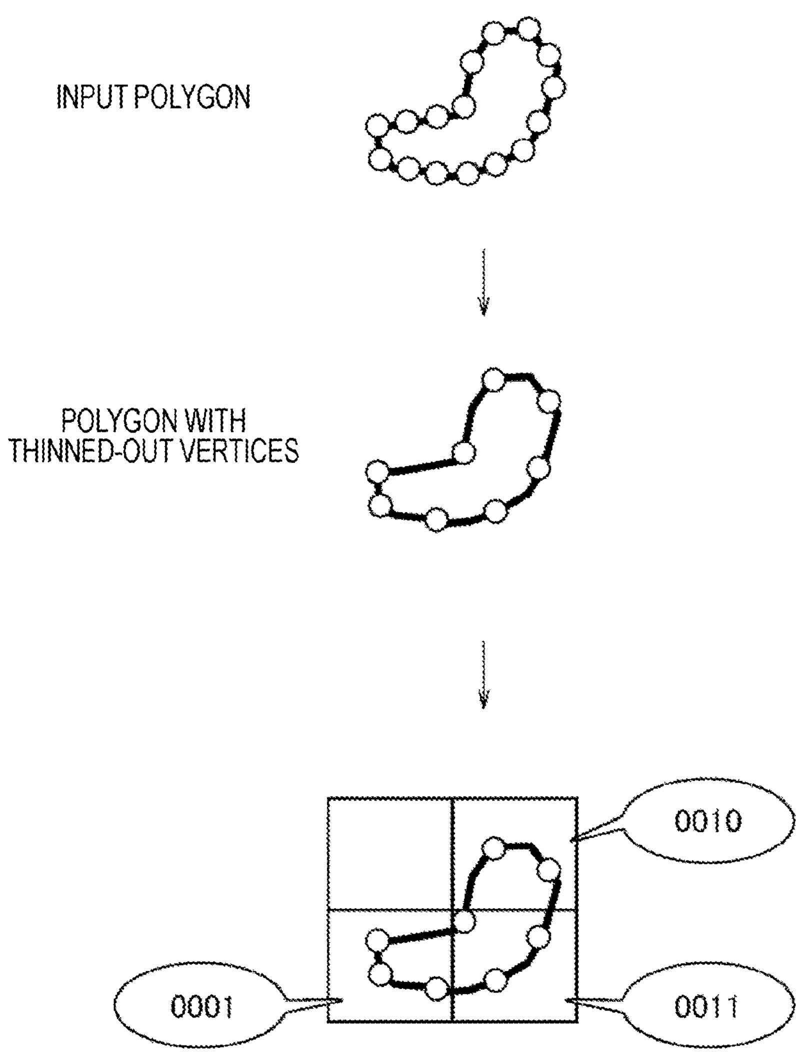
FIG. 6 is a diagram illustrating a state in which vertices of a polygon are thinned out and the polygon is associated with a mesh.

As illustrated in FIG. 6, the polygon storage unit 11 may thin out vertices of the polygon depending on the size of a mesh to such an extent that a feature of the shape of the polygon does not greatly change. By thinning out the vertices of the polygon, it is possible to reduce a load of processing of determining whether or not a designated position exists inside the polygon at the time of search.

The polygon storage unit 11 converts the vertices of the polygon into a bit array, identifies a mesh including the polygon, and associates the polygon with the mesh. In the example of FIG. 6, since each vertex of the mesh is converted to one of three bit arrays of "0001", "0010", and "0011", the polygon is associated with three meshes.

The polygon storage unit 11 may associate meshes at various levels with a polygon. For example, in the example of FIG. 6, the polygon is associated with three meshes "0001", "0010", and "0011". The polygon storage unit 11 may associate the polygon in FIG. 6 with a wider mesh "00", or may associate the polygon in FIG. 6 with a narrower mesh than three meshes "0001", "0010", and "0011".

In step S13, the polygon storage unit 11 registers correspondence information between the mesh and the polygon in the database 13.

Figure 7:
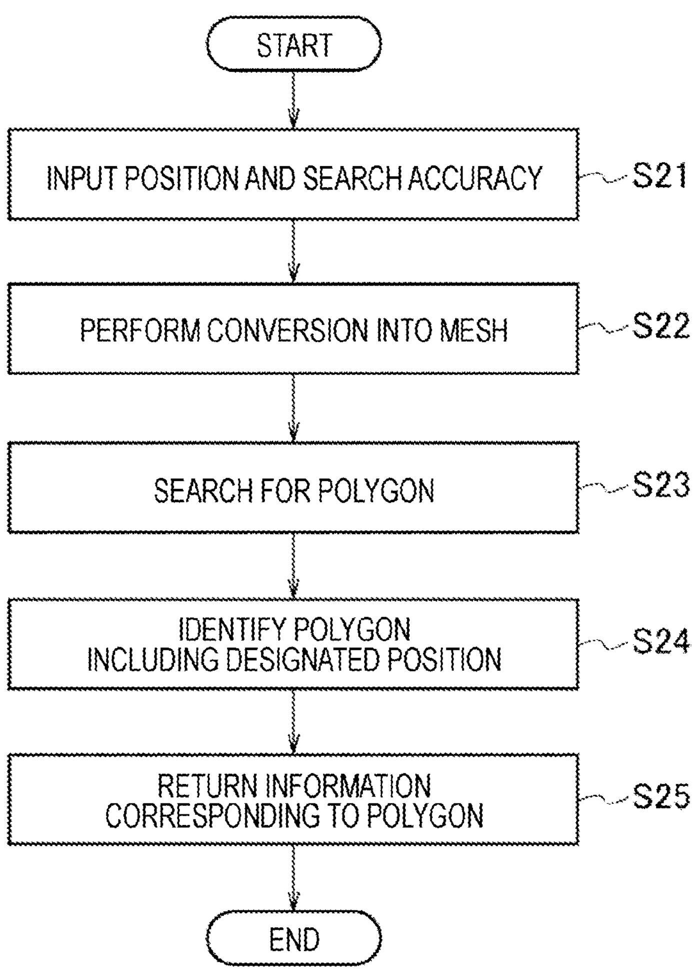
FIG. 7 is a flowchart illustrating an example of a flow of reverse geocoding processing.

Next, a flow of reverse geocoding processing will be described with reference to a flowchart of FIG. 7.

In step S21, the search unit 12 inputs the position information represented by the latitude and longitude and the search accuracy from the client terminal 3.

In step S22, the search unit 12 converts the position information into a mesh having a size depending on the search accuracy. In other words, the search unit 12 converts the position information into a bit array having a length depending on the search accuracy.

Figure 8:
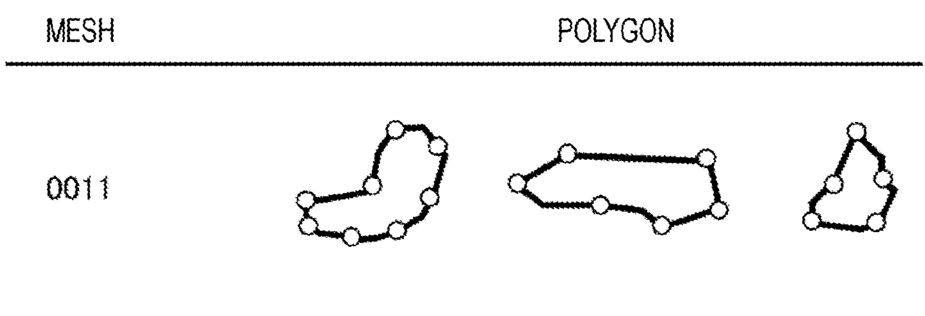
FIG. 8 is a diagram illustrating an example in which a plurality of polygons is obtained as a search result.

In step S23, the search unit 12 searches the database 13 for a polygon associated with the mesh at the designated position. Specifically, the search unit 12 searches the database 13 for a polygon by using the bit array converted in step S22 as a key. For example, as illustrated in FIG. 8, in a case where a plurality of polygons is associated with a mesh, the plurality of polygons is obtained as a search result. The search unit 12 may search for a polygon associated with a mesh having, in high-order bits, the bit array used as the key. For example, when "0001" is used as the key, search may be performed for polygons associated with meshes "000100", "000101", "000110", and "000111".

Figure 9:
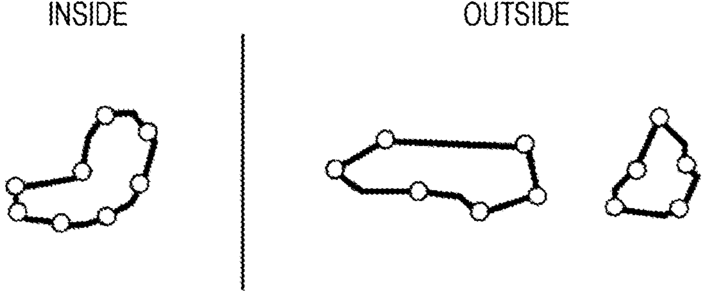
FIG. 9 is a diagram illustrating an example of an inside/outside determination result for the polygons.

In step S24, the search unit 12 identifies a polygon including the designated position from among the plurality of polygons of the search result. Specifically, the search unit 12 performs geometric calculation and distance calculation for each of the polygons obtained by the search, and identifies a polygon within which there is the designated position, or a polygon calculated to be closest to the designated position. FIG. 9 illustrates an example of an inside/outside determination result for the polygons. Note that, in a case where there is only one polygon obtained by the search in step S23, the polygon is set as a polygon including the designated position.

In step S25, the search unit 12 reads the information given to the polygon identified to include the designated position from the database 13 and returns the information to the client terminal 3. For example, the search unit 12 returns a polygon name and a place name to which the polygon belongs.

Next, a usage example of the reverse geocoding device 1 will be described.

The reverse geocoding device 1 can be used for lane level pricing. The lane level pricing is a service for "time billing" for a vehicle present on a specific road/lane. A position of the vehicle is transmitted to the reverse geocoding device 1, and a road and a lane on which the vehicle is traveling can be identified.

The reverse geocoding device 1 can be used to identify jurisdictional police in a case where a traffic accident or the like occurs. The reverse geocoding device 1 stores polygons divided by the jurisdiction of the police. When occurrence position information of the traffic accident is transmitted to the reverse geocoding device 1, the jurisdictional police can be identified. When the search accuracy is designated depending on information desired to be obtained, more appropriate information can be obtained.

By using the reverse geocoding device 1, it is possible to eliminate the need for tickets, commutation tickets, and the like for use in trains, buses, movie theaters, amusement parks, and the like. A user holds the client terminal 3 that periodically transmits the position information to the reverse geocoding device 1 and moves. The reverse geocoding device 1 can identify a transportation or a facility being used from the position information of the user. In the case of application to an amusement park, search accuracy depending on entry and exit management, area movement, and identification of a use facility is designated.

The reverse geocoding device 1 can be used for tagging a captured image or point cloud data. Position information is transmitted to the reverse geocoding device 1 at the time of capturing an image, and information on a place/facility name is obtained. The obtained information is given to the captured image as a tag.

Next, advantages of the reverse geocoding device 1 compared with a conventional technique will be described.

In the conventional technique, it is necessary to perform geometric calculation on all polygons to narrow down polygons in a place including a designated position by the geometric calculation and further identify a detailed position by distance calculation with respect to a result of narrowing down. In addition, there is a method of calculating distances between the designated position and polygons and narrowing down polygons on the basis of the distance, but it is necessary to calculate distances between the designated position and all polygons. Both methods require processing for all polygons stored in the database, and are not suitable for handling a large number of requests in real time.

On the other hand, the reverse geocoding device 1 of the present embodiment obtains a mesh from the designated position, and performs geometric calculation and distance calculation only for polygons present in the obtained mesh, so that it is possible to search for polygons including the designated position at high speed.

In addition, a method is conceivable of obtaining a mesh having a fixed size from the designated position and processing a polygon present in the obtained mesh; however, in the reverse geocoding device 1 of the present embodiment, since search accuracy is input and a polygon is identified on the basis of a mesh having a size depending on the search accuracy, a more flexible search result can be obtained.

As described above, the reverse geocoding device 1 of the present embodiment includes the database 13 that stores polygons and meshes in association with each other, and the search unit 12 inputs position information and search accuracy and converts the position information into a mesh having a size depending on the search accuracy. The search unit 12 searches the database 13 for a polygon associated with the obtained mesh, identifies a polygon corresponding to the position information from among polygons obtained by search, and returns information given to the polygon. In the present embodiment, by associating a polygon corresponding to a mesh divided according to a predetermined rule in advance, it is possible to avoid geometric calculation and distance calculation for all polygons at the time of search and to speed up processing.

Figure 10:
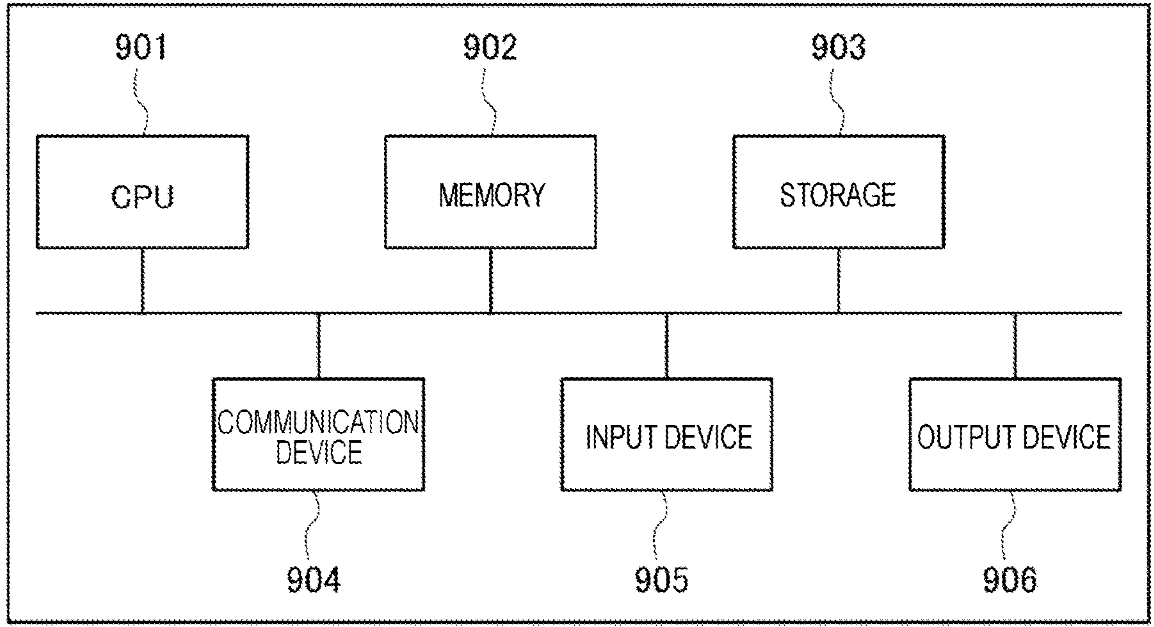
FIG. 10 is a diagram illustrating an example of a hardware configuration of the reverse geocoding device.

As the reverse geocoding device 1 described above, a general-purpose computer system can be used, for example, including a central processing unit (CPU) 901, a memory 902, a storage 903, a communication device 904, an input device 905, and an output device 906 as illustrated in FIG. 10. In this computer system, the CPU 901 executes a predetermined program loaded on the memory 902, thereby implementing the reverse geocoding device 1. This program is stored in a storage device included in the reverse geocoding device 1, and can be recorded on a recording medium such as a magnetic disk, an optical disk, or a semiconductor memory, or can be provided through a network.

REFERENCE SIGNS LIST 1 reverse geocoding device
11 polygon storage unit

12 search unit
13 database
3 client terminal

The invention claimed is:

1. A reverse geocoding device comprising a processor and a memory device storing instructions, wherein execution of the instructions causes the processor to perform operations comprising:

inputting position information of an object and search accuracy;

converting the position information into a mesh having a size based on the search accuracy;

searching a database to obtain a plurality of candidate polygons associated with the mesh, wherein the database is configured to store a plurality of polygons comprising the plurality of candidate polygons and a plurality of meshes associated with the plurality of polygons;

identifying a particular polygon corresponding to the position information from the plurality of candidate polygons; and returning information related to the particular polygon.

2. The reverse geocoding device according to claim 1, the operations further comprising:

inputting information of the plurality of polygons;

reducing the number of vertices of each polygon of the plurality of polygons;

converting remaining vertices of each polygon into bit arrays of one or more meshes;

identifying the one or more meshes including a respective polygon;

storing the plurality of polygons and the plurality of meshes in the database.

3. A reverse geocoding method executed by a reverse geocoding device including a database configured to store a plurality of polygons and a plurality of meshes in association with each other, the reverse geocoding method comprising:

inputting position information of an object and search accuracy;

converting the position information into a mesh having a size based on the search accuracy;

searching the database, from the plurality of polygons, to obtain a plurality of candidate polygons associated with the mesh;

identifying a particular polygon corresponding to the position information from the plurality of candidate polygons; and returning information related to the particular polygon.

4. A non-transitory computer readable medium storing a program, wherein execution of the program causes causing a computer to operate as the reverse geocoding device according to claim 1.

* * * * *